United States Patent
Kallo

(10) Patent No.: US 7,972,746 B2
(45) Date of Patent: *Jul. 5, 2011

(54) DEVICE TO CONTROL THE FLOW SPEED OF MEDIA THROUGH A FUEL CELL STACK

(75) Inventor: Josef Kallo, Stuttgart (DE)

(73) Assignee: GM Global Technology Operations LLC, Detroit, MI (US)

( * ) Notice: Subject to any disclaimer, the term of this patent is extended or adjusted under 35 U.S.C. 154(b) by 1288 days.

This patent is subject to a terminal disclaimer.

(21) Appl. No.: 11/250,850

(22) Filed: Oct. 14, 2005

(65) Prior Publication Data

US 2007/0087255 A1 Apr. 19, 2007

(51) Int. Cl.
*H01M 8/04* (2006.01)
*H01M 8/24* (2006.01)

(52) U.S. Cl. ........ 429/512; 429/443; 429/444; 429/452; 429/457

(58) Field of Classification Search .................. 429/443, 429/444, 452, 457, 512
See application file for complete search history.

(56) References Cited

U.S. PATENT DOCUMENTS

| | | | |
|---|---|---|---|
| 6,187,464 B1 * | 2/2001 | Yasumoto et al. | 429/13 |
| 6,218,038 B1 * | 4/2001 | Oko et al. | 429/34 |
| 6,893,708 B2 * | 5/2005 | Shen et al. | 428/188 |
| 7,601,451 B2 * | 10/2009 | Tighe | 429/38 |
| 2003/0019363 A1 * | 1/2003 | Grover et al. | 96/189 |
| 2004/0137306 A1 * | 7/2004 | Turpin et al. | 429/37 |
| 2005/0145216 A1 * | 7/2005 | Yang et al. | 123/321 |

OTHER PUBLICATIONS

Online translation of JP 2004-146242, Azuma Shugo, Fuel cell system, May 20, 2004.*

* cited by examiner

*Primary Examiner* — Dah-Wei D Yuan
*Assistant Examiner* — Kwang Han
(74) *Attorney, Agent, or Firm* — John A. Miller; Miller IP Group, PLC

(57) ABSTRACT

A fuel cell stack that includes a stack of fuel cells each having a cathode side bipolar plate including parallel cathode gas flow channels. Airflow from a cathode inlet manifold is directed to the flow channels to provide the cathode gas to the fuel cell membrane. The fuel cell stack includes a device positioned within the inlet manifold that selectively blocks a predetermined number of the flow channels for each cell at low load operation to increase the flow rate in the unblocked flow channels, so that the fuel cell stack generates the desired low load output, and the increased flow rate prevents water from accumulating in the unblocked flow channels.

20 Claims, 2 Drawing Sheets

DEVICE TO CONTROL THE FLOW SPEED OF MEDIA THROUGH A FUEL CELL STACK

BACKGROUND OF THE INVENTION

1. Field of the Invention

This invention relates generally to a device for controlling a gas flow to a fuel cell and, more particularly, to a device for controlling the flow of air to the cathode side of a fuel cell, where the device includes a member for blocking a predetermined number of cathode side flow channels during low load conditions.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is disassociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. The PEMFC generally includes a solid-polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation. These conditions include proper water management and humidification, and control of catalyst poisoning constituents, such as carbon monoxide (CO).

Several fuel cells are typically combined in a fuel cell stack to generate the desired power. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack. The bipolar plates include an anode side and a cathode side for adjacent fuel cells in the stack. Anode gas flow channels are provided on the anode side of the bipolar plates that allow the anode gas to flow to the anode side of each MEA. Cathode gas flow channels are provided on the cathode side of the bipolar plates that allow the cathode gas to flow to the cathode side of each MEA. The bipolar plates are made of a conductive material, such as stainless steel, so that they conduct the electricity generated by the fuel cells from one cell to the next cell as well as out of the stack. The bipolar plates also include flow channels through which a cooling fluid flows.

FIG. 1 is a cross-sectional view of a fuel cell 10 of the type discussed above. The fuel cell 10 includes a cathode side 12 and an anode side 14 separated by an electrolyte membrane 16. A cathode side diffusion media layer 20 is provided at the cathode side 12, and a cathode side catalyst layer 22 is provided between the membrane 16 and the diffusion media layer 20. Likewise, an anode side diffusion media layer 24 is provided at the anode side 14, and an anode catalyst layer 26 is provided between the membrane 16 and the diffusion media layer 24. The catalyst layers 22 and 26 and the membrane 16 define an MEA. The diffusion media layers 20 and 24 are porous layers that provide for input gas transport to and water transport from the MEA. Various techniques are known in the art for depositing the catalyst layers 22 and 26 on the diffusion media layers 20 and 24, respectively, or on the membrane 16.

A cathode side flow field plate or bipolar plate 18 is provided on the cathode side 12 and an anode side flow field plate or bipolar plate 30 is provided on the anode side 14. The bipolar plates 18 and 30 are positioned between the fuel cells in a fuel cell stack. A hydrogen gas flow 28 from flow channels (not shown in FIG. 1) in the bipolar plate 30 reacts with the catalyst layer 26 to disassociate the hydrogen ions and the electrons. Airflow 36 from flow channels (not shown in FIG. 1) in the bipolar plate 18 reacts with the catalyst layer 22. The hydrogen ions are able to propagate through the membrane 16 where they electro-chemically react with the airflow 36 and the return electrons in the catalyst layer 22 to generate water.

As is well understood in the art, the membranes within a fuel cell need to have a certain relative humidity so that the ionic resistance across the membrane is low enough to effectively conduct protons. During operation of the fuel cell, water from the MEAs and external humidification may enter the anode and cathode flow channels. The water may accumulate in the flow channels, especially at low loads where the flow rate of the reactant gas will be low. It has been shown that water accumulation becomes a problem at current densities below 0.2-0.4 $A/cm^2$ and a cell stoichiometry of 2-4.

A flow channel in which liquid water has accumulated will have a lower reactant flow than the flow channels where no water has accumulated. Because the flow channels are in parallel, the input gas may not flow through a channel with water accumulation, thus preventing the water from being forced out and allowing for increased water accumulation therein. Those areas of the membrane that do not receive input gas as a result of the channel being blocked will not generate electricity, thus resulting in a non-homogenous current distribution and reducing the overall efficiency of the fuel cell. Significant water accumulation in a single cell could result in severe reactant blockage to that cell and cause the cell to fail. Because the fuel cells are electrically coupled in series, if one of the fuel cells stops performing, the entire fuel cell stack may stop performing.

It is possible to purge the accumulated water in the flow channels by forcing the anode gas or the cathode gas through the flow channels at a higher flow rate than is necessary to meet the output load demands (higher stoichiometry). However, there are many reasons not to use the hydrogen fuel as a purge gas, including reduced economy, reduced system efficiency and increased-system complexity for treating elevated concentrations of hydrogen in the exhaust gas stream. For these reasons, it will be desirable to at least minimize the water accumulating in the anode side flow channels of the fuel cells.

Reducing accumulated water in the channels can also be accomplished by reducing inlet humidification. However, it is desirable to provide some relative humidity in the anode and cathode gases so that the membrane in the fuel cells remains hydrated. A dry inlet gas has a drying effect on the membrane that could increase the ionic resistance, and limit the membrane's long-term durability.

Accumulated water in the cells can also reduce performance of the fuel cell when operated in an environment where the temperature goes below 0° C. The accumulated water could also lead to mechanical damage in these environments.

SUMMARY OF THE INVENTION

In accordance with the teachings of the present invention, a fuel cell stack is disclosed that includes a stack of fuel cells each having a cathode side bipolar plate including parallel cathode gas flow channels. Airflow from a cathode inlet manifold is directed to the flow channels to provide the cathode gas to the fuel cell membrane. The fuel cell stack includes a device positioned within the inlet manifold that selectively blocks a predetermined number of the flow channels in each cell at low load operation to increase the flow rate in the unblocked flow channels. Therefore, the fuel cell stack generates the desired low load output, and the increased flow rate prevents water from accumulating in the unblocked flow channels.

In one embodiment, the device includes a flat plate that is raised and lowered relative to the flow channels based on the fuel cell stack load. The plate can be raised and lowered in a linear motion or be pivoted relative to the flow channels to block and unblock the channels. In another embodiment, the device includes an inflatable membrane that is inflated to block some of the flow channels during the low load condition.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a device for selectively blocking and unblocking flow channels in a cathode side of a fuel cell is merely exemplary in nature, and is in no way intended to limit the invention or its applications or uses.

Figure 1:
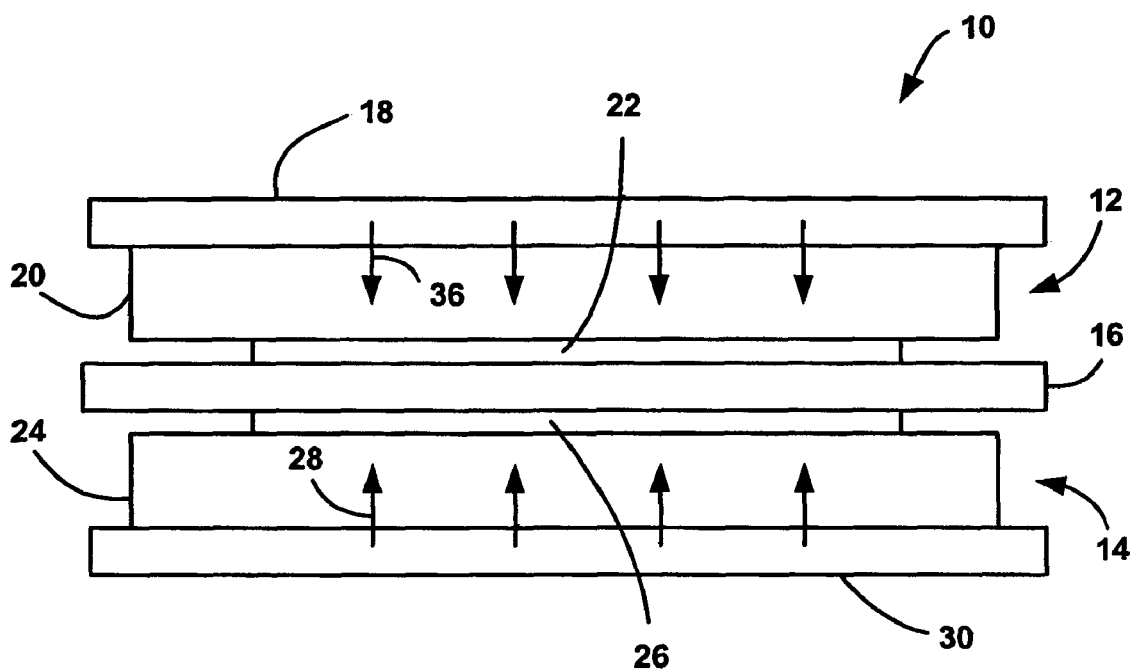
FIG. 1 is a side plan view of a fuel cell in a fuel cell stack.
Figure 2:
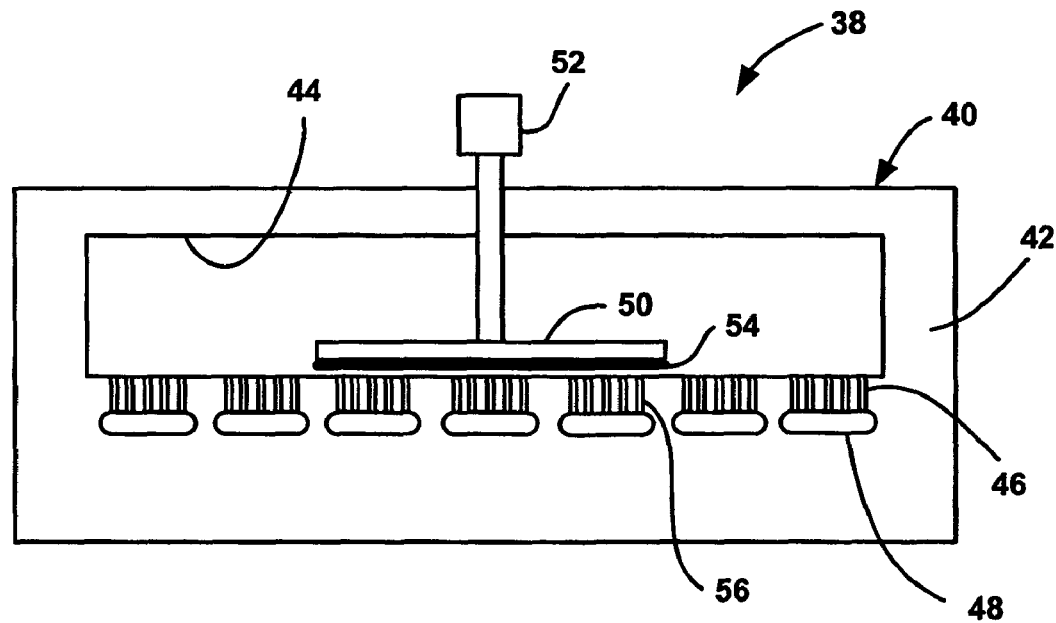
FIG. 2 is a top view of a portion of a fuel cell in a fuel cell stack, including a reciprocating plate for blocking a predetermined number of cathode flow channels in a cathode side bipolar plate, according to one embodiment of the present invention.

FIG. 2 is a top plan view of a portion of the cathode side of a fuel cell 40 in a fuel cell stack 38. The fuel cell 40 includes a cathode side bipolar plate 42 that defines part of a cathode air inlet manifold 44 that directs the air to the cathode side of all of the fuel cells in the stack 38. Particularly, a stack of the bipolar plates each including an opening defines the inlet manifold 44. The inlet manifold 44 is in fluid communication with a plurality of cathode flow channels 46 that direct the airflow from the inlet manifold 44 through vertical channels 48 through the diffusion media layer 20 to the catalyst layer 22.

According to the invention, the fuel cell stack 38 includes a flap or plate 50 extending through the inlet manifold 44 and positioned adjacent to a predetermined number of the flow channels 46 in each of the fuel cells. An actuation member 52 is connected to the plate 50 and extends outside of the fuel cell stack 38, as shown. The actuation member 52 can be any device suitable for the purposes discussed herein, such as an actuation rod and an electrical motor. The actuator member 52 is actuatable to linearly position the plate 50 over a predetermined number of the flow channels 46, represented as blocked channels 56. The plate 50 can be made of any suitable material for the purposes discussed herein, such as steel, aluminum and Teflon. A seal 54, such as rubber member, can be provided on a sealing surface of the plate 50 to provide sealing, noise reduction and cushioning.

The plate 50 extends across all of the fuel cells in the stack 38 so that upon actuation of the member 52, a predetermined number of the flow channels 46 in each of the several fuel cells 40 in the stack 38 are blocked and unblocked together. The plate 50 can be selectively positioned to block the flow channels 56 during low load operation, such as below 0.4 A/cm$^2$, so that the flow rate in the unblocked channels 46 is increased over what it would be if all of the channels 46 were unblocked. By providing this higher flow rate through the unblocked channels 46 at low load conditions, any water that begins to accumulate in the unblocked channels 46 is forced through the channels 46 and prevented from further accumulating therein.

The number of the channels 46 that are blocked can be any suitable number that provides the desired flow rate to prevent water from accumulating in the unblocked channels 46. The areas of the membrane 16 that do not receive the airflow when the channels 56 are blocked do not provide an electrical chemical reaction, and thus do not generate product water that could otherwise accumulate in the unblocked channels 46. In one embodiment, the output voltage of the fuel cells in the stack 38 are monitored, and if the voltage of a fuel cell drops below a predetermined value, such as 75% of the average cell voltage, then it is assumed that water is accumulating in the flow channels for that cell. The plate 50 is then moved to block the flow channels 56 to remove the water.

As discussed above, the plate 50 is positioned within the cathode inlet manifold 44. However, in other designs, the plate 56 can be positioned within the cathode outlet manifold. Also, it may be desirable to provide a blocking plate in the anode inlet or outlet manifold to prevent water accumulation in the anode flow channels at low loads in the same manner.

Figure 3:
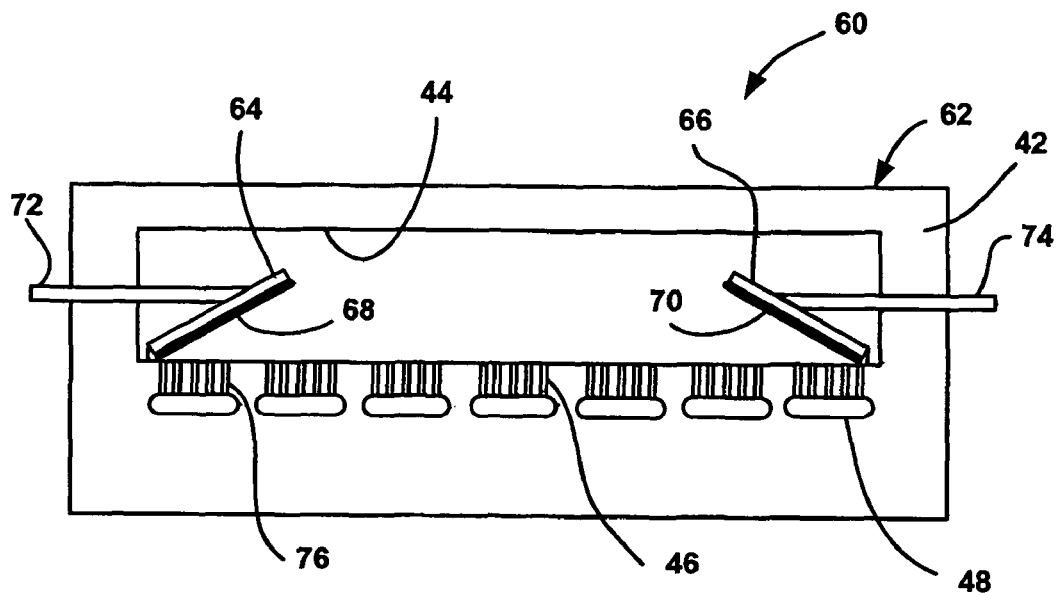
FIG. 3 is a top view of a portion of a fuel cell in a fuel cell stack including a device that is pivotally actuated to block and unblock a predetermined number of the cathode flow channels in the fuel cell, according to another embodiment of the present invention.

The linearly reciprocating plate 50 of the fuel cell stack 38 is one example of how the predetermined number of flow channels 46 can be blocked. FIG. 3 is a top view of the cathode side of a fuel cell 62 associated with a fuel cell stack 60 similar to the fuel cell stack 38, where like elements are represented by the same reference numeral. In this embodiment, the plate 50 has been replaced with two pivotable plates 64 and 66 including rubber base portions 68 and 70, respectively. An actuation device 72 pivotally actuates the plate 64 and an actuation device 74 pivotally actuates the plate 66. In this embodiment, the plates 64 and 66 block end channels 76 of the flow channels 46, where airflow is provided to the center channels 46. Of course, the plates 64 and 66 can be replaced with the linearly movable plates at the ends of the flow channels 46.

Figure 4:
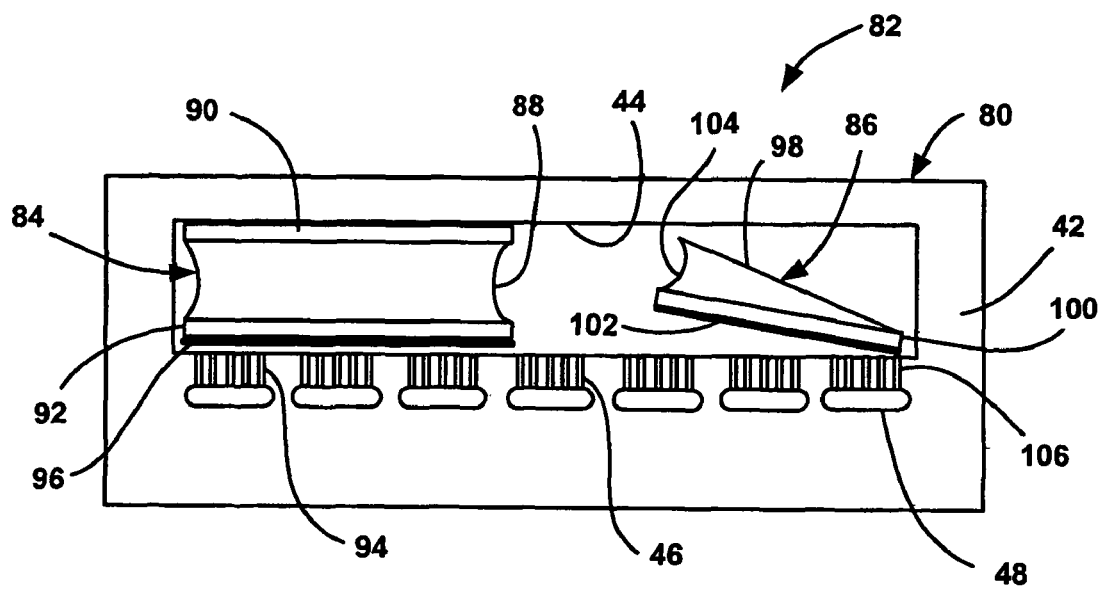
FIG. 4 is top plan view of a portion of a fuel cell including an inflatable membrane that is inflated to block a predetermined number of the flow channels during low load conditions.

FIG. 4 is a top plan view of the cathode side of a fuel cell 80 associated with a fuel cell stack 82 similar to the fuel cell stacks 60 and 38 discussed above, where like reference numerals are identified by the same reference numeral. The fuel cell stack 82 includes an inflatable membrane device 84 at one end of the inlet manifold 44 and an inflatable membrane device 86 at the other end of the inlet manifold 44. The membrane device 84 includes a membrane 88 mounted to a fixed plate 90 and a blocking plate 92, where the plate 92 includes a seal 96. The membrane 88 is inflatable where the plate 90 remains fixed and the plate 92 moves to block end channels 94. The membrane 88 is deflated to raise the plate 92 and unblock the channels 94.

The inflatable membrane device 86 includes a fixed plate 98 and a sealing plate 100 having a seal 102. A membrane 104 is mounted to the plates 98 and 100. The membrane 104 is inflated to cause the fixed plate 100 to pivot and block end channels 106 and is deflated to unblock the end channels 106 consistent with the discussion above.

Figure 5:
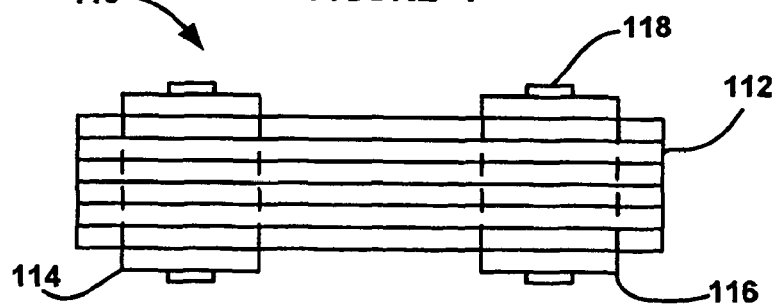
FIG. 5 is a side view of a fuel cell stack showing actuators for actuating the various flow channel blocking devices in FIGS. 2-4.

FIG. 5 is a side view of a fuel cell stack 110 including a plurality of stacked fuel cells 112. The fuel cell stack 110 includes actuators 118, such as actuation rods, that actuate plates 114 and 116 positioned within the inlet manifold and extending across all of the fuel cells 94 as discussed above.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell stack comprising:
a cathode side manifold responsive to an airflow;
a stack of fuel cells including cathode side bipolar plates each having a plurality of parallel flow channels; and
at least one blocking device positioned within the manifold, said blocking device being physically connected to an actuation member and being configured to be selectively movable to block a predetermined number of the plurality of flow channels in a manner that prevents the airflow from entering the blocked flow channels and increases the flow rate in the unblocked channels.

2. The fuel cell stack according to claim 1 wherein the at least one blocking device is at least one blocking plate.

3. The fuel cell stack according to claim 2 wherein the at least one blocking plate is linearly movable relative to the flow channels.

4. The fuel cell stack according to claim 2 wherein the at least one blocking plate is pivotally movable relative to the flow channels.

5. The fuel cell stack according to claim 1 wherein the at least one blocking device is an inflatable membrane.

6. The fuel cell stack according to claim 1 wherein the at least one blocking device is two blocking plates positioned at opposite ends of the manifold.

7. The fuel cell stack according to claim 1 wherein the at least one blocking device is controlled to block the channels at stack loads below 0.4 A/cm$^2$.

8. The fuel cell stack according to claim 1 wherein the fuel cell stack is part of a fuel cell engine on a vehicle.

9. A fuel cell comprising:
a bipolar plate including a plurality of flow channels; and
a blocking device positioned relative to the plurality of flow channels, said blocking device being physically connected to an actuation member and being configured to be selectively movable to block a predetermined number of the plurality of flow channels in a manner that prevents a gas flow from entering the blocked flow channels and increases the gas flow rate in the unblocked channels.

10. The fuel cell according to claim 9 wherein the blocking device is a blocking plate.

11. The fuel cell according to claim 10 wherein the blocking plate is linearly movable relative to the flow channels.

12. The fuel cell according to claim 9 wherein the blocking plate is pivotally movable relative to the flow channels.

13. The fuel cell according to claim 9 wherein the blocking device is an inflatable membrane.

14. A fuel cell stack for a vehicle, said fuel cell stack comprising:
a cathode side inlet manifold responsive to an airflow;
a stack of fuel cells including cathode side bipolar plates each having a plurality of parallel flow channels; and
at least one blocking device positioned within the inlet manifold, said blocking device being physically connected to an actuation member and being configured to be selectively movable to block a predetermined number of the plurality of flow channels in a manner that prevents the airflow from entering the blocked flow channels and increases the flow rate in the unblocked channels for removing water in the unblocked channels, wherein the at least one blocking device is controlled to block the channels at stack loads below 0.4 A/cm$^2$.

15. The fuel cell stack according to claim 14 wherein the at least one blocking device is at least one blocking plate.

16. The fuel cell stack according to claim 15 wherein the at least one blocking plate is linearly movable relative to the flow channels.

17. The fuel cell stack according to claim 15 wherein the at least one blocking plate is pivotally movable relative to the flow channels.

18. The fuel cell stack according to claim 14 wherein the at least one blocking device is an inflatable membrane.

19. The fuel cell stack according to claim 14 wherein the at least one blocking device is two blocking plates positioned at opposite ends of the manifold.

20. The fuel cell stack according to claim 14 further comprising an electrical motor for actuating the at least one blocking device.

\* \* \* \* \*